United States Patent
Noguera

(10) Patent No.: US 9,969,352 B2
(45) Date of Patent: May 15, 2018

(54) VEHICLE SAFETY DEVICE

(71) Applicant: Angel Noguera, Charleston, SC (US)

(72) Inventor: Angel Noguera, Charleston, SC (US)

( * ) Notice: Subject to any disclaimer, the term of this patent is extended or adjusted under 35 U.S.C. 154(b) by 0 days. days.

(21) Appl. No.: 15/234,548

(22) Filed: Aug. 11, 2016

(65) Prior Publication Data

US 2017/0043745 A1 Feb. 16, 2017

Related U.S. Application Data

(60) Provisional application No. 62/204,019, filed on Aug. 12, 2015.

(51) Int. Cl.
*B60R 22/30* (2006.01)
*A62B 3/00* (2006.01)
*B60R 22/18* (2006.01)

(52) U.S. Cl.
CPC .............. *B60R 22/30* (2013.01); *A62B 3/005* (2013.01); *B60R 2022/1806* (2013.01)

(58) Field of Classification Search
CPC ............ B60R 22/30; B60R 2022/1806; B25D 2250/271; A62B 3/005; A44B 11/2565
See application file for complete search history.

(56) References Cited

U.S. PATENT DOCUMENTS

| | | | |
|---|---|---|---|
| 821,176 A * | 5/1906 | Leland | B26B 11/00 30/143 |
| 3,523,342 A | 8/1970 | Spires | |
| 5,149,189 A * | 9/1992 | Kawamura | A44B 11/2523 24/633 |
| 5,248,187 A * | 9/1993 | Harrison | B60R 22/30 297/468 |
| 5,630,242 A * | 5/1997 | Oginaezawa | B26B 27/00 30/294 |
| 5,642,567 A * | 7/1997 | Lin | A62B 3/005 30/366 |
| 5,878,478 A * | 3/1999 | Hasegawa | A62B 3/005 206/349 |
| 5,892,436 A * | 4/1999 | Blackburn | A44B 11/2565 180/268 |
| 5,952,916 A * | 9/1999 | Yamabe | B25D 1/00 340/321 |
| 5,983,463 A | 11/1999 | Prentkowski et al. | |
| 6,219,890 B1 * | 4/2001 | Souther | A44B 11/2561 24/631 |

(Continued)

FOREIGN PATENT DOCUMENTS

CN 203182157 9/2013
GB 2446134 A * 8/2008 ............. B60R 22/30

(Continued)

OTHER PUBLICATIONS

PCT International Search Report and Written Opinion, dated Dec. 28, 2016.

*Primary Examiner* — Laura Freedman
(74) *Attorney, Agent, or Firm* — B. Craig Killough; Barnwell Whaley Patterson & Helms

(57) ABSTRACT

A seat belt extender comprises a rotatable member having multiple blades of different sizes that engage the receptacle mounted to the vehicle. At the opposite end of the seat belt extender is a receptacle that receives the blade that is connected to the seat belt and/or seat belt and shoulder harness.

14 Claims, 5 Drawing Sheets

(56) References Cited

U.S. PATENT DOCUMENTS

| | | | | |
|---|---|---|---|---|
| 6,343,841 B1* | 2/2002 | Gregg | ..................... | B60R 22/30 |
| | | | | 297/464 |
| 6,969,122 B2 | 11/2005 | Sachs et al. | | |
| 7,794,024 B1* | 9/2010 | Kranz | ................ | A44B 11/2542 |
| | | | | 24/579.11 |
| 8,015,643 B2* | 9/2011 | White | .................... | A62B 3/005 |
| | | | | 7/144 |
| 8,495,777 B1* | 7/2013 | Dixon | ....................... | B26B 3/06 |
| | | | | 30/123 |
| 2004/0231169 A1 | 11/2004 | Roberson | | |
| 2006/0267394 A1 | 11/2006 | David et al. | | |
| 2007/0245530 A1* | 10/2007 | Gray | .................. | A44B 11/2546 |
| | | | | 24/633 |
| 2009/0224595 A1* | 9/2009 | Pfefferman | ............. | B60R 22/30 |
| | | | | 297/468 |
| 2010/0281660 A1 | 11/2010 | Lee | | |
| 2011/0101765 A1 | 5/2011 | Brents | | |
| 2015/0014975 A1 | 1/2015 | Bahattab | | |
| 2015/0166006 A1 | 6/2015 | Cannady | | |
| 2017/0158164 A1* | 6/2017 | Crouch | ................... | B60R 22/18 |

FOREIGN PATENT DOCUMENTS

| | | | | |
|---|---|---|---|---|
| JP | 10291439 A | * 11/1998 | ............... | B25D 1/00 |
| JP | 2010241419 | 10/2010 | | |
| WO | WO2009064355 | 5/2009 | | |

\* cited by examiner

VEHICLE SAFETY DEVICE

Applicant claims the benefit of Provisional Application Ser. No. 62/204,019 filed Aug. 12, 2015.

FIELD OF THE INVENTION

This invention relates to safety devices for vehicle seat belts.

BACKGROUND OF THE INVENTION

Seat belts are mandatory equipment in all vehicles manufactured and sold in the United States and in most other countries. Seat belts are also mandatory in most airplanes in current manufacture and seat belts are commonly used in many other vehicles.

Seat belts are characterized by a belt that surrounds the waist of the wearer opposite the seat, and frequently, the belt is joined to a shoulder harness.

A flat blade is retained by the belt, with the flat blade usually having a slidable engagement with the belt. The flat blade engages a receiver that is mounted in a sturdy fashion to the vehicle, sometimes having a pivoting mounting to the vehicle.

In some applications, it is desirable to be able to extend the effective size or length of the seat belt. Examples include persons who have a large girth and pregnant women who desire or require a longer seat belt. Also, seat belts can be used to retain articles, rather than persons, within the seat. The seat belt extender may allow larger items to be retained by the seat belt, increasing the safety of transporting such articles.

A seat belt extender is typically an item that is sold and used on an after-market basis, and is not supplied as original equipment. The user of the seat belt extender may own vehicles produced by more than one manufacturer. Therefore, the blades and receivers for each vehicle may be of different sizes.

Window breaking devices for vehicles are useful in emergencies. If a vehicle becomes suddenly submerged, electric windows will not work, and water pressure prevents doors from opening. Other situations indicate that an exit through a window is advisable, such as when a vehicle that has been in an accident that damages the doors, and fire or smoke is present. Tempered glass of the type used in automobiles and trucks is difficult to break without an appropriate tool. When a tool is present inside the vehicle, the tool may not be readily accessible or the location may not be known to the passenger.

SUMMARY OF THE INVENTION

The present invention is a seat belt extender. The seat belt extender comprises a rotatable member having multiple blades of different sizes that engage the receptacle mounted to the vehicle. At the opposite end of the seat belt extender is a receptacle that receives the blade that is connected to the seat belt and/or seat belt and shoulder harness. The seat belt extender comprises a window breaker. The length of the device provides substantial force to break a car window during an emergency.

BRIEF DRAWING DESCRIPTION

Figure 5B:
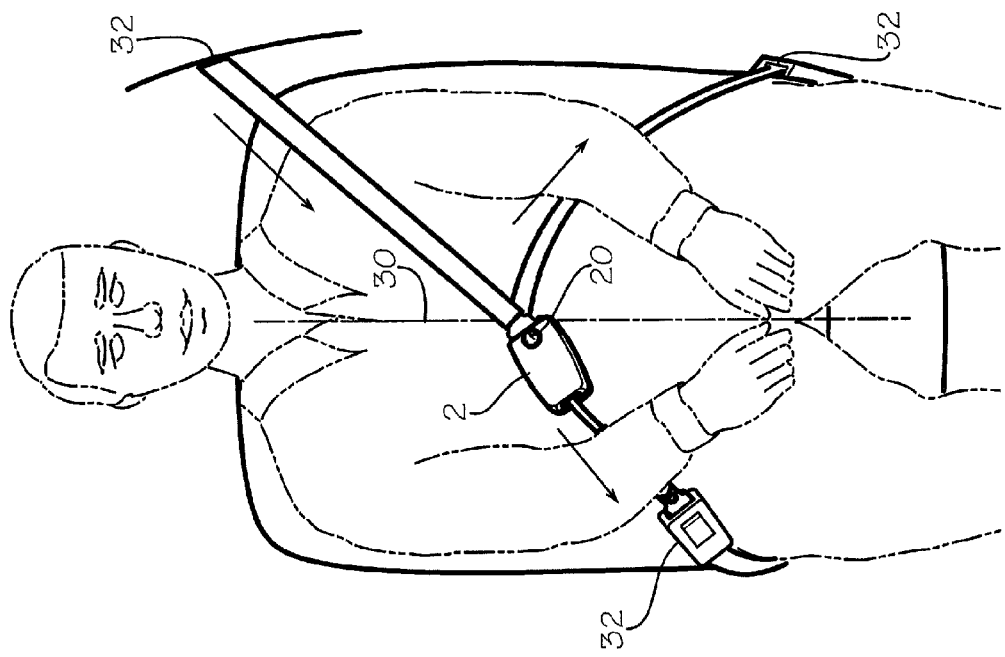
Figure 5A:
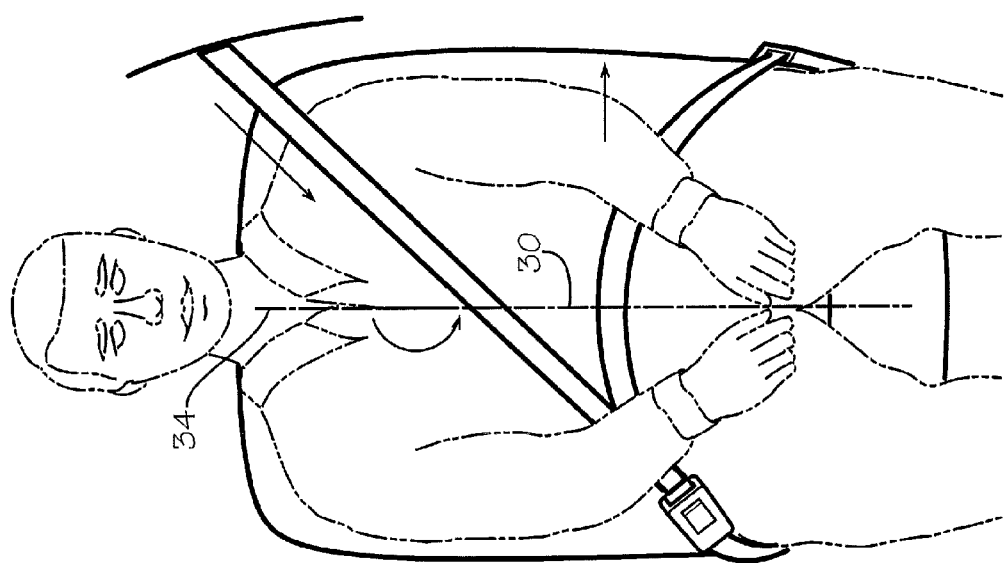

FIG. 5A demonstrates positioning of a seat belt before use of the extender device according to the invention.

FIG. 5B demonstrates possible positioning of the seat belt extender of the device.

DESCRIPTION OF PREFERRED EMBODIMENTS

Figure 1:
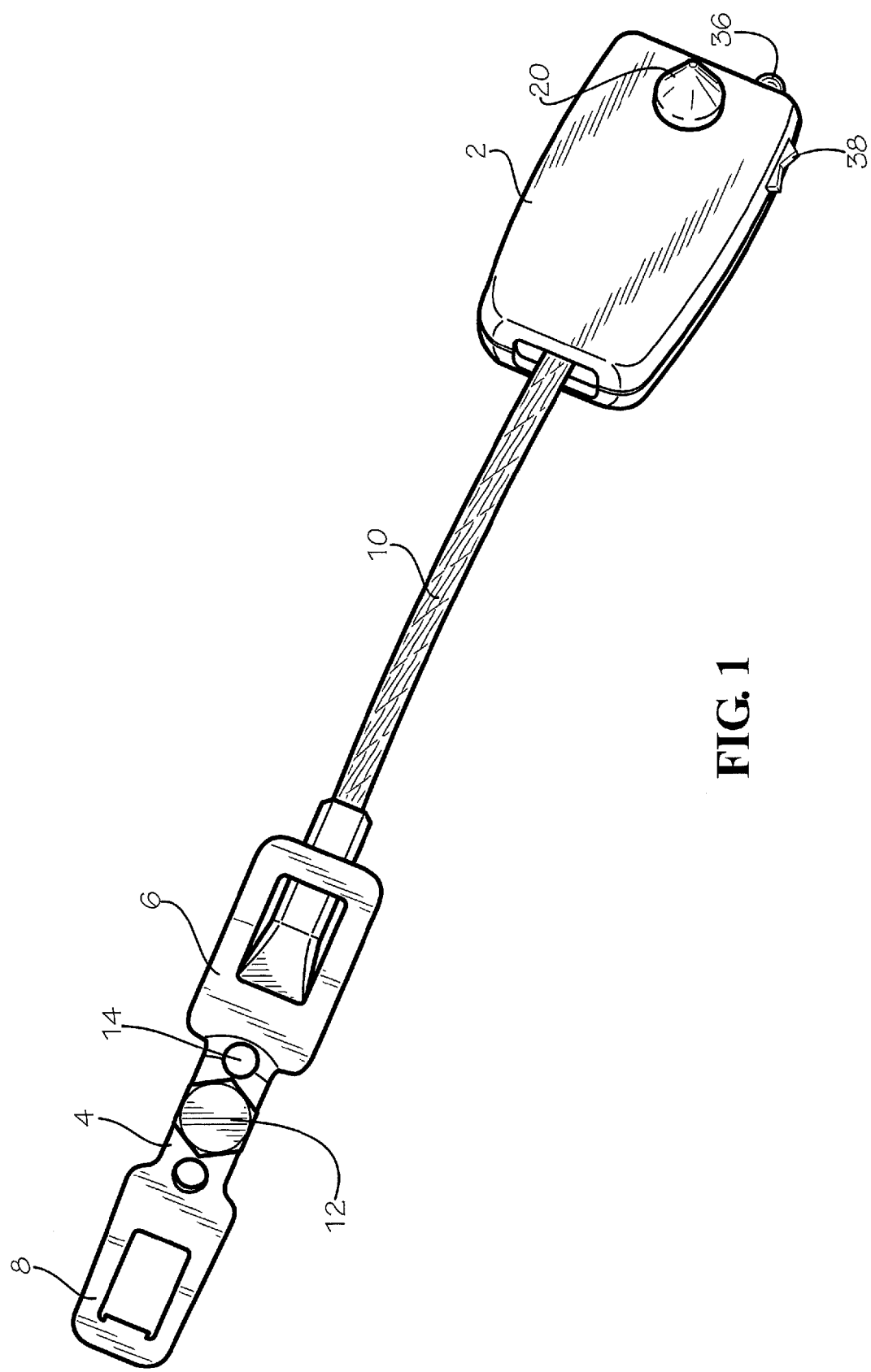
FIG. 1 is a perspective view of a seat belt extender according to an embodiment of the invention.
Figure 2:
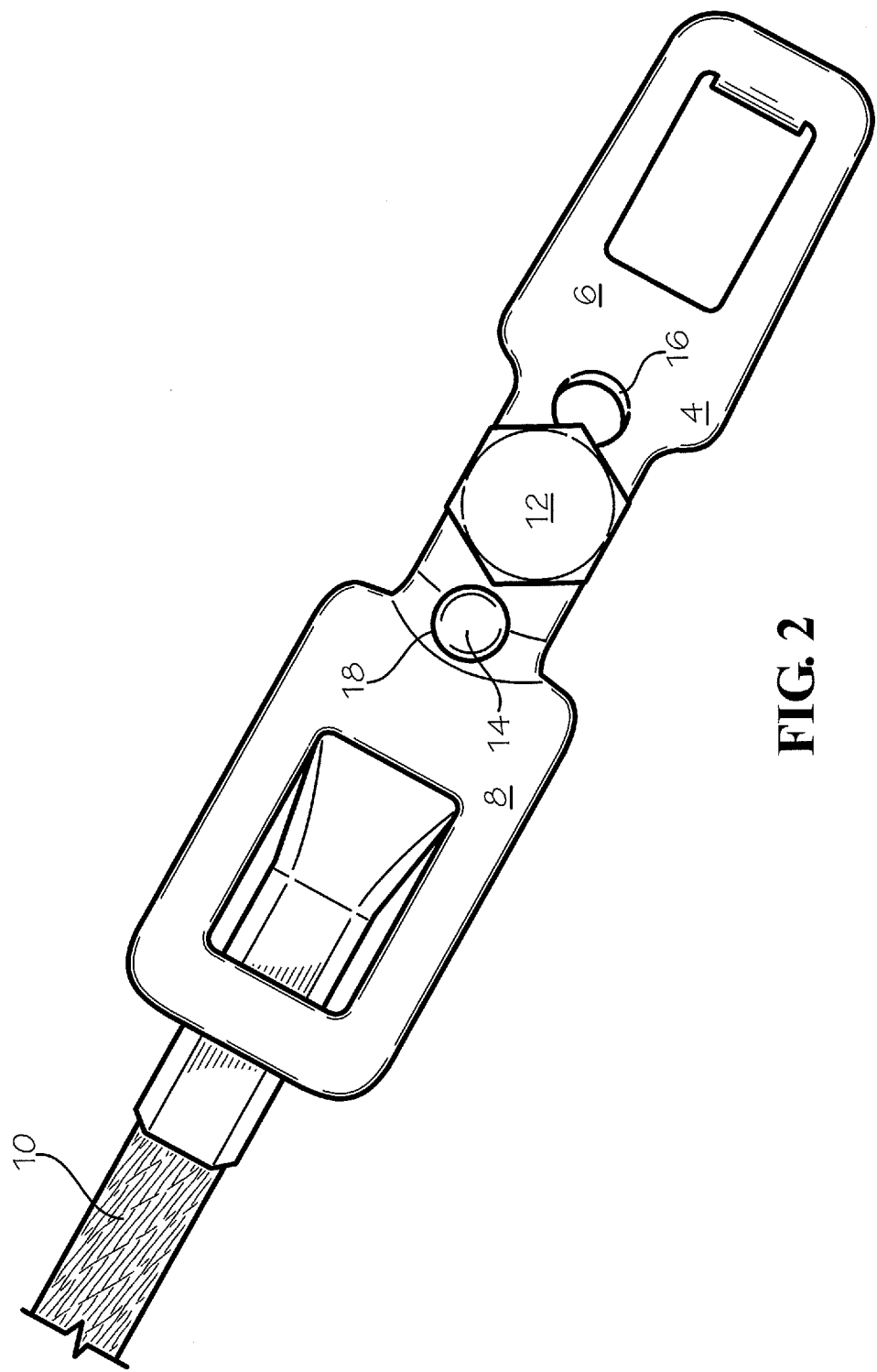
FIG. 2 is a top plan view of a rotatable member of the invention comprising multiple blades.
Figure 3:
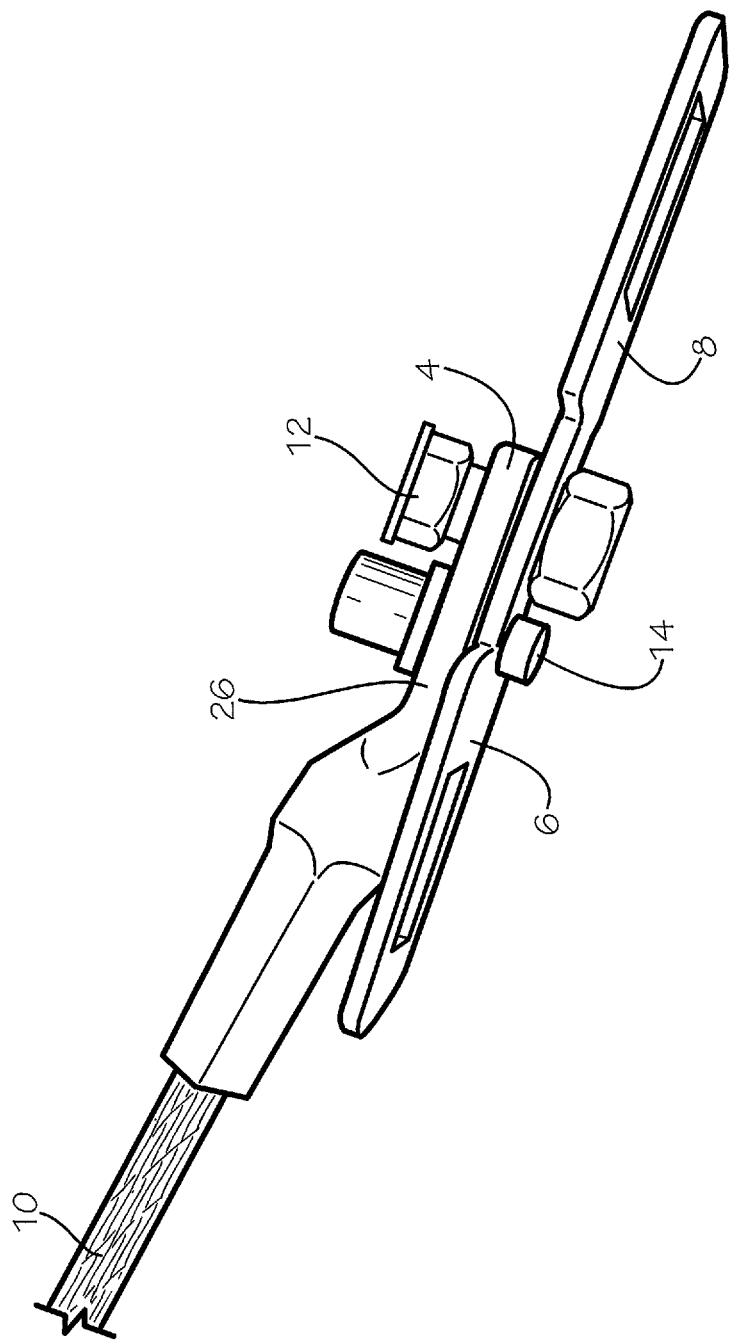
FIG. 3 is a side view of the rotatable member having multiple blades.
Figure 4:
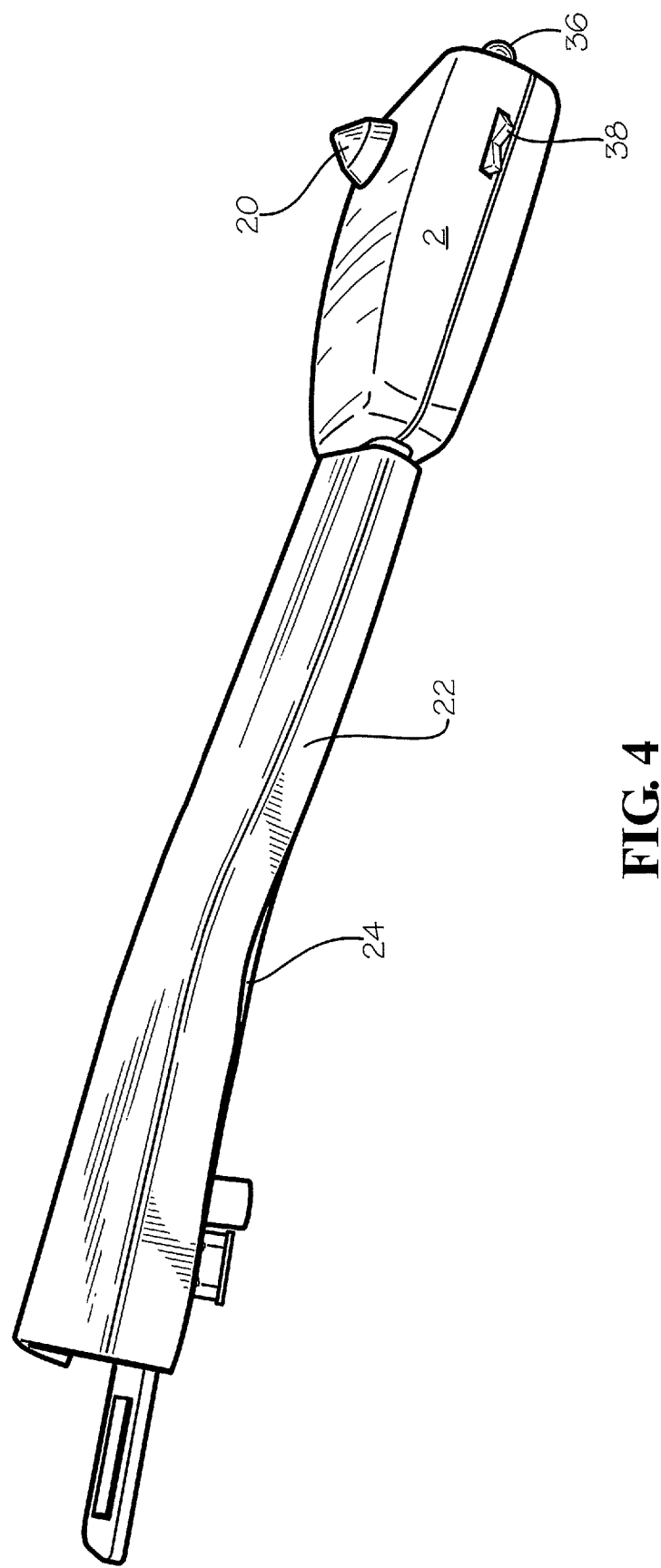
FIG. 4 is a seat belt extender according to an embodiment of the invention having a cover over the structural elements of the device.

Referring to the drawing figures, FIG. 1 shows a receptacle 2; a linkage 10; and an end assembly 4 comprising opposing blades 6, 8 that rotate relative to a center axis 12.

The receptacle 2 is universal for most cars and trucks that have seat belt blades that are either about ⅞" or about 1" in width. Most vehicles for sale in the United States have one of these sizes. The receptacle is constructed and arranged to accept these sizes of blades. The receptacle may be formed to accept other sizes according to embodiments of the invention.

However, there is no universal blade that will fit substantially all receptacles found in cars and trucks. Receptacles in many vehicles require a blade of about ⅞" blade or a blade of about 1" (as used in General Motors vehicles).

The present invention provides, in a preferred embodiment, opposing blades formed as a unit. In one embodiment, one blade 6 is about ⅞" in width, and the opposite blade 8 is about 1" wide. Other widths may be provided for other applications. The blades are rotatably mounted to a base member 26 at approximately the center of the blade construct. A pin or axle 12 mounts the blade construct to the base member, while permitting rotation of the blade construct.

A blade of the appropriate width chosen by the user is rotated to extend from the seat belt extender opposite the linkage 10. The blade 8 is in position for insertion into the receptacle of the vehicle as shown in the illustrations.

A secure stop is provided to limit rotation of the blades once the chosen blade is in position for insertion into the receptacle. In a preferred embodiment, a spring biased detent 14 is provided. Opposing voids 16, 18 are provided in the blade construct opposite the axle 12. The voids engage the spring biased detent that is mounted to the base member 26.

The base member 26 is securely mounted to the linkage 10. The linkage is preferred to be flexible, but must be sufficiently strong to meet safety regulations for seat belts. In one embodiment, wound stainless steel cable is used as the linkage. The base member may be swaged to the cable. The linkage is preferred to be not less than 15 cm. in length, and is more preferred to be between 25 and 50 cm. in length for most applications.

The linkage 10 is securely mounted to the receptacle that is positioned opposite the blade construct. In a preferred embodiment, the receptacle comprises a window breaker 20. The window breaker may be used to break a window of the vehicle in an emergency. The protrusion may be a conically shaped hard metal, such as stainless steel, or more preferably, tungsten carbide. The conically shaped window breaker may extend from a base mounted to the exterior of the receptacle and extend away form the base to form a point at a free end thereof.

A cover 22 may be provided for the device. The cover may extend from the receptacle at one end to the base member at the opposite end, covering the linkage, and the blade of the blade construct that is not inserted into the receptacle of the vehicle. A portion, or all, of the cover may be split 24 along one side of the cover to permit access to the remaining blade, and to permit rotation of the blade construct as described herein. The cover is preferred to be resilient, such as formed of a plastic material like polypropylene, and have shape memory properties. If split along its length, the cover may be easily removed and easily replaced to surround the linkage and some or all of the end assembly 4.

In use, a seat belt blade of the vehicle is inserted into the receptacle 2. The appropriate blade is rotated into position to extend from an end of the device, and is locked into position, such as by engagement of the spring biased detent 14 with the associated void 18. The selected blade of the device is inserted into the receptacle of the vehicle. The seat belt extender is removed from the vehicle as one would disengage a seat belt blade from a vehicle's receptacle, except that both the blade of the device and the receptacle of the device are disengaged from the vehicle. Optionally, the blade of the vehicle may remain in the receptacle, with the seat belt extender remaining in position for use in the vehicle.

The additional length provided by the devices may elevate the receptacle 2. The resulting attachment point may bring the attachment point closer to the center of mass of a wearer 30, as demonstrated by FIGS. 5A and 5B. It is believed the wearer may be subjected to less torque in the event of a sudden stop, perhaps which may reduce about the centerline 34 resulting in less rotation of the spine. It is also believed that forces against the seat belt during a sudden stop are more evenly distributed to each of the attachment points 32 of the seat belt.

The embodiment that incorporates the window breaker 20 may be used by removing the seat belt extender from its engagement with the vehicle. For example, if the vehicle is overwhelmed by water, the seat belt extender may be removed and used to break a window. The length of the linkage and the flexibility of the linkage 10 provide a whiplash effect that provides additional velocity for the window breaker over hammer type devices. The increased velocity of the window breaker assists in breaking a window.

The position of the window breaker on the seat belt construct makes the window breaker readily available in the event of an occurrence where time is of the essence, such as when a vehicle interior is filling with smoke or water, or is on fire. A user need not hunt through the interior of the car for a tool to break a window. The invention provides a window breaker that is readily available. Removal of the seat belt is necessary for exiting in any event so that only one additional step is necessary, which is separating the seat belt extender from the stock vehicle seat belt.

The housing of the receptacle may incorporate a flashlight, such as an LED flashlight 36, and batteries. A switch 38 may be provided to actuate the light, and the device used as a flashlight after removal from the vehicle. One or more LEDs may be positioned on either side of the receptacle that receives the blade in some embodiments of the invention. The flashlight may be waterproof. Light is provided by the device independently of the vehicle's electrical system, which may not function in the event of an accident.

What is claimed:

1. A vehicle safety device, comprising:
    a female receptacle constructed and arranged to receive and hold a male end of a vehicle seat belt;
    a construct comprising a first blade constructed and arranged to engage and be held within a seat belt receptacle of a vehicle, and comprising a second blade constructed and arranged to engage and be held within a seat belt receptacle of the vehicle; and
    a flexible linkage that connects the female receptacle and the construct;
    wherein the construct is selectively rotatable relative to the flexible linkage.

2. A vehicle safety device as described in claim 1, further comprising a locking mechanism that secures the construct with either the first blade or the second blade as selected extending past the flexible linkage.

3. A vehicle safety device as described in claim 1, wherein the first blade is constructed and arranged to be held within a seat belt receptacle of a first configuration and the second blade is constructed and arranged to be held within a seat belt receptacle of a second configuration that is dimensionally different than the seat belt receptacle of the first configuration.

4. A vehicle safety device as described in claim 1, wherein the flexible linkage is formed of wire cable.

5. A vehicle safety device as described in claim 1, wherein the female receptacle comprises a light emitter.

6. A vehicle safety device as described in claim 1, wherein the flexible linkage has a length of not less than 15 centimeters.

7. A vehicle safety device as described in claim 1, wherein the female receptacle comprises a window breaker.

8. A vehicle safety device as described in claim 7, the window breaker comprising a base that narrows along its length to form a point, wherein the window breaker is formed of hard metal.

9. A vehicle safety device as described in claim 8, wherein the hard metal comprises tungsten carbide.

10. A vehicle safety device, comprising:
    a female receptacle constructed and arranged to receive and hold a male end of a vehicle seat belt;
    a construct comprising a first blade constructed and arranged to engage and be held within a seat belt receptacle of a vehicle;
    a flexible linkage that connects the female receptacle and the construct, the flexible linkage having a length of not less than 15 centimeters; and
    a second construct comprising the female receptacle and a window breaker, the window breaker comprising a base that narrows along its length to form a point, wherein the window breaker is formed of hard metal.

11. A vehicle safety device as described in claim 10, wherein the flexible linkage is formed of wire cable.

12. A vehicle safety device as described in claim 10, wherein the hard metal comprises tungsten carbide.

13. A vehicle safety device as described in claim 10, wherein the construct further comprises a second blade.

14. A vehicle safety device as described in claim 10, wherein the female receptacle comprises a light emitter.

* * * * *